Patented July 28, 1942

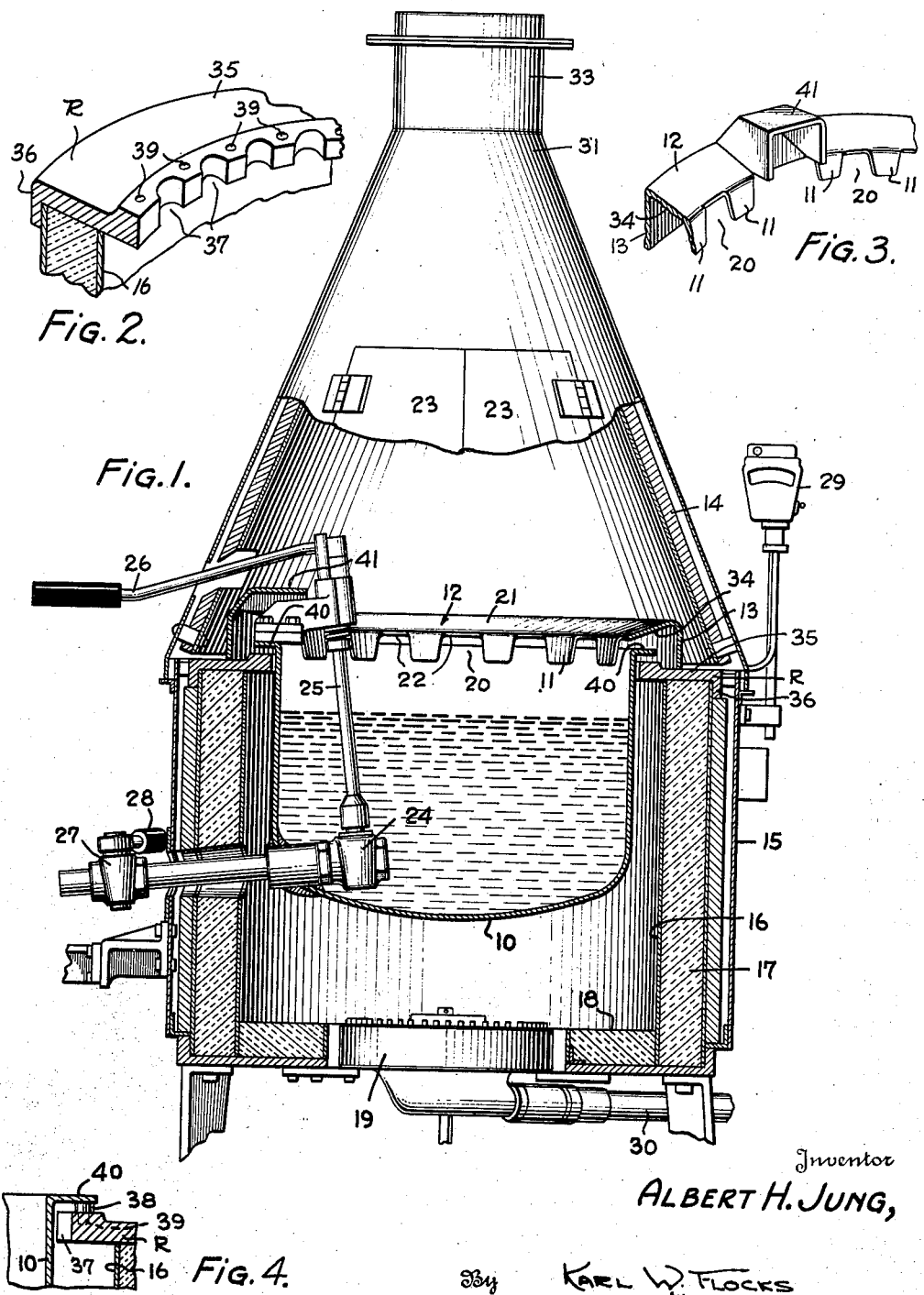

2,291,083

UNITED STATES PATENT OFFICE 2,291,083

FURNACE CONSTRUCTION

Albert H. Jung, Flushing, N. Y., assignor to United American Metals Corporation, Brooklyn, N. Y., a corporation of New York Application November 29, 1941, Serial No. 421,053

6 Claims. (Cl. 266—33)

This invention relates to furnace construction and more particularly to a novel melting pot suspension means and baffle for controlling and directing the flow of hot gases.

Prior to the instant invention it has been customary to provide a flue for the passage of hot gases leaving the exterior of the melting pot of the furnace and also to provide separate means for the support of the melting pot above the burner. In such constructions the metal in the melting pot is subject to formation of a more or less definite amount of dross on the surface thereof. In addition, in such construction metal pieces may be inadvertently lodged between the melting pot and the interior walls of the furnace requiring the operator to clean out this space during shut-down periods.

It is an object of the invention to provide a novel furnace construction involving a melting pot suspension means which will simultaneously serve to support the melting pot within the furnace, provide a flue passage between the side walls of the melting pot and the interior side walls of the furnace, direct the flow of hot flue gases from about the sides of the melting pot downwardly onto the surface of the molten metal within the pot to minimize the formation of dross therewithin, and serve as a directing baffle for directing pieces of metal to be melted which inadvertently are placed or thrown to a position above the space between the melting pot and the interior walls of the furnace into the melting pot.

It is another object of the instant invention to provide a furnace construction involving a novel hot gas passageway which serves to direct the flow of hot gases onto the surface of the metal within the melting pot.

Other objects and the nature and advantages of the invention will be apparent from the following description taken in conjunction with the accompanying drawing, wherein:

Figure 1 is a fragmentary vertical sectional view of a furnace in accordance with the instant invention;

Fig. 2 is a fragmentary view in perspective of the kettle ring construction for supporting the melting pot;

Fig. 3 is a fragmentary view in perspective of the novel collar construction for directing the flow of hot gases; and Fig. 4 is a detailed sectional view of the kettle supporting ring.

Referring to the drawing, the melting pot 10 is supported by the depending elements 11 which extend from the inner end of the inclined collar-like baffle 12 which is supported at its outer vertical flange 13 by the top of the kettle ring R which is secured to the furnace 15. The lower inner walls 16 of the furnace 15 may comprise insulation 17 and said inner walls serve to surround the lower end wall portion 18 and burner 19 from which the hot gases emanate and pass upwardly about the lower portion and sides of the melting pot 10 and thence to the under side 34 of the collar-like baffle 12. From the under side of the baffle 12 the hot gases are directed downwardly and through the openings 20 between the elements 11 and onto the surface of the metal within the melting pot.

The upper side 21 of the collar-like baffle 12 extends downwardly and inwardly from adjacent the walls 14 to its inner periphery 22, the diameter of which is less than the inner diameter of the melting pot 10, whereby any pieces of metal which are lodged over the space between the exterior of the melting pot and the inner walls 16 are directed to within the melting pot 10.

By supporting the melting pot 10 from the depending elements 11 as by welding the two together, the hot gas passageway between the sides of the melting pot and the walls 16 may be kept clear and the construction for the support of the melting pot maintained relatively simple and economical.

The melting pot 10 is adapted to be fed through the opening closed by the doors 23 and molten metal may be discharged from the melting pot 10 by operation of the valve 24 which is actuated by the rotation of the rod or stem 25 which in turn is controlled by the circumferential or rotary movement of the handle 26. The valve 24 may be in series with an additional valve 27 controlled by the handle 28.

The furnace is adapted to be automatically controlled by the thermostatic device 29 which may control a valve, not shown, in the line 30 which serves to feed the burner 19 with fuel so that when the temperature about or within the melting pot is above a predetermined maximum, the rate of flow of fuel may be diminished and when the temperature is at a predetermined minimum, the rate of flow of fuel may be increased.

The walls 14 converge so that the upper portion 31 of the furnace 15 is in the shape of a frustrated cone. The top 32 of the frustrated cone is joined to a chimney piece 33 for leading the spent flue gases from the furnace 15.

It has been found in practice that the collar-like baffle 12 makes for a great saving in loss of metal which would ordinarily take place because of the formation of dross and which is now eliminated by the directing of the hot gases uniformly over the surface of the hot metal within the melting pot by the plurality of successive openings 20 between the downwardly and outwardly extending elements 11 which depend from the under surface 34 of the baffle 12. In addition, provision for the support of the melting pot on the sides of the furnace has been eliminated because the collar-like baffle 12 has been made to serve this function. Further, the collar-like baffle 12 not only acts to support the melting pot and direct the flow of hot gases more or less continuously from about the upper periphery down onto the surface of the hot molten metal within the melting pot, but it directs particles of metal into the melting pot which may be lodged over the space outside of the side walls of the melting pot. Savings in fuel have also been effected by this construction because the hot gases leading from about the melting pot are directed onto the surface of the melting pot and they do not serve to heat the upper walls 14 of the furnace.

The kettle ring R may comprise a generally horizontal portion 35 and a depending flange 36 at its outer periphery which are adapted to extend over and about the top of the walls 16. The inner periphery of the kettle ring R is formed with a plurality of spaced openings 37 to provide a through passage for hot gases to the under side 34 of the collar 12. Vertically upwardly projecting spacing elements 38 are located in sockets 39 in the top of the ring R on each side of each opening 37 to support the flange 40 extending generally horizontally from the side walls of the pot 10. These projecting elements space the flange of the pot from the openings 37 for the purpose set forth above.

The collar 12 is provided with an integral upwardly projecting housing formation 41 to accommodate the operating mechanism and its support for the valve 24. This housing formation 41, however, extends about a very small proportion of the periphery of the collar 12.

It will be obvious to those skilled in the art that various changes may be made in this device without departing from the spirit of the invention and therefore the invention is not limited to what is shown in the drawing and described in the specification but only as indicated in the appended claims.

What I claim is:

1. In metal melting apparatus, a melting pot having side walls, a burner located therebelow, furnace walls about the side walls of said melting pot and in spaced relation thereto to provide a passageway for hot gases emanating from said burner, a collar located substantially immediately above said melting pot and extending substantially continuously about the upper periphery thereof for directing the flow of gases from said passageway down onto the surface of the metal within said melting pot, said collar being supported by said furnace walls, said pot being secured to at least a part of the inner portion of said collar.

2. The structure recited in claim 1, said collar including a plurality of spaced depending elements extending downwardly from the inner periphery of the upper portion thereof, said pot being secured to said spaced depending elements.

3. In metal melting apparatus, a melting pot having side walls, a burner located therebelow, furnace walls about the side walls of said melting pot and in spaced relation thereto to provide a passageway for hot gases emanating from said burner, a collar located substantially immediately above said melting pot and extending substantially continuously about the upper periphery thereof for directing the flow of gases from said passageway down onto the surface of the metal within said melting pot, a kettle ring secured to said furnace walls, said collar being secured to said kettle ring and being spaced from the upper periphery of said melting pot.

4. In metal melting apparatus, a melting pot having side walls, a burner located therebelow, furnace walls about the side walls of said melting pot and in spaced relation thereto to provide a passageway for hot gases emanating from said burner, a collar located substantially immediately above said melting pot and extending substantially continuously about the upper periphery thereof for directing the flow of gases from said passageway down onto the surface of the metal within said melting pot, said collar being secured to said melting pot by a series of spaced depending elements, each of said elements being fixed to the upper portion of said melting pot and to the underside of said collar whereby the spaces between said elements provide fluid passages for the gas emanating from said burner and passing up through said passageway.

5. In metal melting apparatus, a melting pot having side walls, a burner located therebelow, furnace walls about the side walls of said melting pot and in spaced relation thereto to provide a passageway for hot gases emanating from said burner, a collar located substantially immediately above said melting pot and extending substantially continuously about the upper periphery thereof for directing the flow of gases from said passageway down onto the surface of the metal within said melting pot, said collar being a substantially flat annulus extending inwardly and downwardly, said collar being secured within said furnace walls substantially continuously about its outer periphery and being spaced from the top of said melting pot, said collar being secured to said melting pot by a series of spaced depending elements occurring substantially entirely about the periphery of said melting pot, said elements being secured to said melting pot adjacent the upper portion thereof and connected to the underside of said collar, the inner periphery of said collar being in overhanging relation to the upper periphery of said melting pot.

6. In metal melting apparatus, a melting pot having side walls, a burner located therebelow, furnace walls about the side walls of said melting pot and in spaced relation thereto to provide a passageway for hot gases emanating from said burner, a collar located substantially immediately above said melting pot and extending substantially continuously about the upper periphery thereof for directing the flow of gases from said passageway down onto the surface of the metal within said melting pot, a kettle ring secured to said furnace walls and being formed with openings therethrough, vertically projecting spacing elements on said kettle ring, said melting pot having a generally horizontal flange projecting outwardly from its side walls, said flange resting on said spacing elements, said collar having a depending flange extending from the outer periphery thereof, said depending flange being secured to said ring outside of the openings therethrough so that hot gases passing upwardly between the pot and furnace side walls may pass therethrough and be directed by said collar onto the surface of the metal within the pot.

ALBERT H. JUNG.